US008113937B2

(12) United States Patent
Bennett et al.

(10) Patent No.: US 8,113,937 B2
(45) Date of Patent: Feb. 14, 2012

(54) SLOT MACHINE PIN AND BALL GAME

(75) Inventors: Nicholas Luke Bennett, Mosman (AU); David Villa, Cronulla (AU); Christopher Michael Stevens, Lane Cove (AU)

(73) Assignee: Aristocrat Technologies Australia Pty Ltd. (AU)

( * ) Notice: Subject to any disclaimer, the term of this patent is extended or adjusted under 35 U.S.C. 154(b) by 0 days.

(21) Appl. No.: 12/324,546

(22) Filed: Nov. 26, 2008

(65) Prior Publication Data

US 2009/0209311 A1 Aug. 20, 2009

Related U.S. Application Data

(63) Continuation of application No. 09/856,869, filed as application No. PCT/AU99/01047 on Nov. 24, 1999, now abandoned.

(30) Foreign Application Priority Data

Nov. 24, 1998 (AU) ........................................ PP7293

(51) Int. Cl.
*A63F 9/24* (2006.01)
*G06F 17/00* (2006.01)

(52) U.S. Cl. ... 463/16; 273/121 A; 273/108; 273/121 B; 273/126 A; 273/123 R; 463/3; 463/7; 463/30

(58) Field of Classification Search ........................ None
See application file for complete search history.

(56) References Cited

U.S. PATENT DOCUMENTS 3,807,541 A * 4/1974 Kortenhaus .................. 194/217
3,897,951 A * 8/1975 Morrison et al. ......... 273/121 A
4,162,793 A * 7/1979 Cummings ............... 273/121 A
4,360,203 A * 11/1982 Garbark ..................... 273/121 A
4,375,286 A * 3/1983 Seitz et al. ................ 273/121 A
4,448,417 A * 5/1984 Clark et al. ............... 273/121 A
4,840,375 A * 6/1989 Lawlor et al. ............. 273/121 A
4,956,775 A * 9/1990 Klamer et al. ................ 473/480
5,016,879 A * 5/1991 Parker et al. .............. 273/126 A
5,388,828 A * 2/1995 Takemoto et al. ........ 273/121 B
5,395,110 A * 3/1995 Yamazaki et al. ............ 273/108
5,507,488 A * 4/1996 Eddy et al. ................ 273/127 R
5,509,655 A * 4/1996 Ugawa ...................... 273/121 B
5,634,639 A * 6/1997 Tokito et al. .............. 273/123 R
5,700,193 A * 12/1997 d'Achard Van Enschut ..... 463/3
5,704,612 A * 1/1998 Kelly et al. ................... 273/402
5,788,230 A * 8/1998 Krise et al. ................ 273/121 B
5,836,819 A * 11/1998 Ugawa ............................ 463/30

(Continued)

OTHER PUBLICATIONS

Krypton Egg 95. Schwerin, R., PC computing, v9, n12, p. 306, Dec. 1996.*

(Continued)

*Primary Examiner* — Paul A. D'Agostino
(74) *Attorney, Agent, or Firm* — McAndrews, Held & Malloy, Ltd.

(57) ABSTRACT

An electronic gaming console is illustrated having a console cabinet 10 including a prize display 12, a coin entry slot 13, a payout tray 14 and internally mounted game control processor circuits. A video game is provided for play on the console in which mages of objects (balls) are dropped through a series of obstacles (pins) and eventually fill a number of containers. Prizes are paid according to either the number of balls which are in each container at the end of the ball drop and/or the manner in which the pins are hit.

30 Claims, 13 Drawing Sheets

U.S. PATENT DOCUMENTS

| | | | | |
|---|---|---|---|---|
| 5,904,352 | A * | 5/1999 | Takemoto | 273/121 B |
| 7,192,342 | B2 * | 3/2007 | Shoemaker, Jr. | 463/7 |
| 2001/0013680 | A1 * | 8/2001 | Chaaban | 273/121 B |
| 2002/0065119 | A1 * | 5/2002 | Togami | 463/4 |
| 2003/0020235 | A1 * | 1/2003 | Brenner | 273/144 B |

OTHER PUBLICATIONS

Krypton Egg 95, You Tube screen shot 1.*
Krypton Egg 95, You Tube screen shot 2.*

* cited by examiner

SLOT MACHINE PIN AND BALL GAME

RELATED APPLICATIONS

This application claims priority to, and is a continuation of U.S. patent application Ser. No. 09/856,869, which is the National Stage (filed on May 28, 2001) of International Application No. PCT/AU99/01047 having an international filing date of Nov. 24, 1999, which claims priority to Australian Patent Application No. PP7293 filed Nov. 24, 1998, all of which are incorporated herein by reference in their entirety.

INTRODUCTION

The present invention relates to gaming machines or consoles of the type generally referred to as slot machines, and in particular the invention provides a new type of game played on such a machine.

Players who regularly play gaming machines quickly tire of particular games and therefore it is necessary for manufacturers of these machines to come up with innovative games or game features that add interest to the games provided on such machines in order to keep the players amused and therefore willing to continue playing the game.

DESCRIPTION OF THE PRIOR ART

Gaming or poker machines have been well known in the state of New South Wales for many years and have more recently gained considerable popularity throughout Australia, with quite substantial amounts of money wagered on these machines. There is a growing tendency for State governments to legalise the use of gaming machines by licensing operators, with resulting revenue gains through licence fees and taxation of monies invested. The licensed operation of gaming machines is the subject of State legislation and regulation. This regulation almost always dictates a minimum percentage payout for a gaming machine. For example, a minimum of 85% of monies invested must be returned as winnings, and manufacturers of gaming machines therefore must design their machines around these regulatory controls.

With the growth that has occurred in the gaming machine market there is intense competition between manufacturers to supply the various existing and new venues. When selecting a supplier of gaming machines, the operator of a venue will often pay close attention to the popularity of various games with their patrons.

Therefore, gaming machine manufacturers are keen to devise games which are popular with players, as a mechanism for improving sales.

In particular, manufacturers regularly devise new games which have not previously been seen on slot machines in order to stimulate renewal of player interest.

Pachinko is a game popular in Japan in which an 11 mm diameter steel ball is fired into a labyrinth of pins or nails projecting from a back panel and awards are gained if the balls can be caused to come to rest in certain locations. Typically, when a ball is caused to come to rest in a designated prize winning position, the player is rewarded with additional balls, the number of balls awarded to the player being dependant on the particular location that the ball is brought to rest. The player purchases balls from the operator before commencing play, or when he runs out and after stopping play, a player may exchange balls for non-monetary prizes.

In this specification the term Gaming console will be used to refer to a gaming machine of the type having a video display screen on which a game is displayed with player inputs being either by physical buttons joysticks etc or by pseudo buttons, etc, provided as touch sensitive areas on the display, or a mixture of each. Typical games that have previously been provided on such consoles include video simulations of spinning reels or video card games among others.

SUMMARY OF THE INVENTION

The present invention provides a game for an electronic gaming console having credit means, reward means, game control means, display means, and player input controls, the control means being responsive to the credit means and the player input controls to play a game which is displayed on the display means and if a winning event occurs, a player reward is awarded by the reward means, the gaming console being characterised in that the game provides a video display of a labyrinth of pins and the player input controls allow the player to initiate the motion of ball images on the display, player rewards being awarded when the ball images come to rest in predetermined prize winning locations.

In some embodiments, the player controls may also be used to control firing parameters such as firing speed and firing direction. Player controls may also be used to operate features which affect the trajectory of a ball after it is fired.

In one embodiment, the game is characterised in that the number of balls provided to a player for a game is dependant upon a number of credits bet on the game. In some embodiments, the number of balls provided for the first credit may be different to the number of balls provided for subsequent credits wagered on a game.

In another embodiment, the game is characterised in that the configuration of the labyrinth of pins is varied depending upon the number of credits bet.

In yet a further embodiment, the game is characterised in that rewards are assigned to one or more of the pins, such that the reward is awarded if the pin is struck by a ball and the number of pins having rewards assigned to them is related to the number of credits bet.

According to yet a further embodiment, the game is characterised in that a plurality of targets (which may include cups, buckets or pins are provided and rewards are assigned to the targets such that if a ball comes to rest in or on the target, a reward is awarded and the number of targets provided is related to the number of credits bet.

Another embodiment provides a game in which rewards provided in the game have values which are a function of the number of credits bet.

BRIEF DESCRIPTION OF THE DRAWINGS

Embodiments of the present invention will now be described by way of example with reference to the accompanying drawings in which.

DETAILED DESCRIPTION OF THE PREFERRED EMBODIMENTS

In the following detailed description, the methodology of the embodiments will be described and it is to be understood that it is within the capabilities of the non-inventive worker in the art to introduce the methodology on any standard microprocessor based gaming console by means of appropriate programming.

Figure 1:
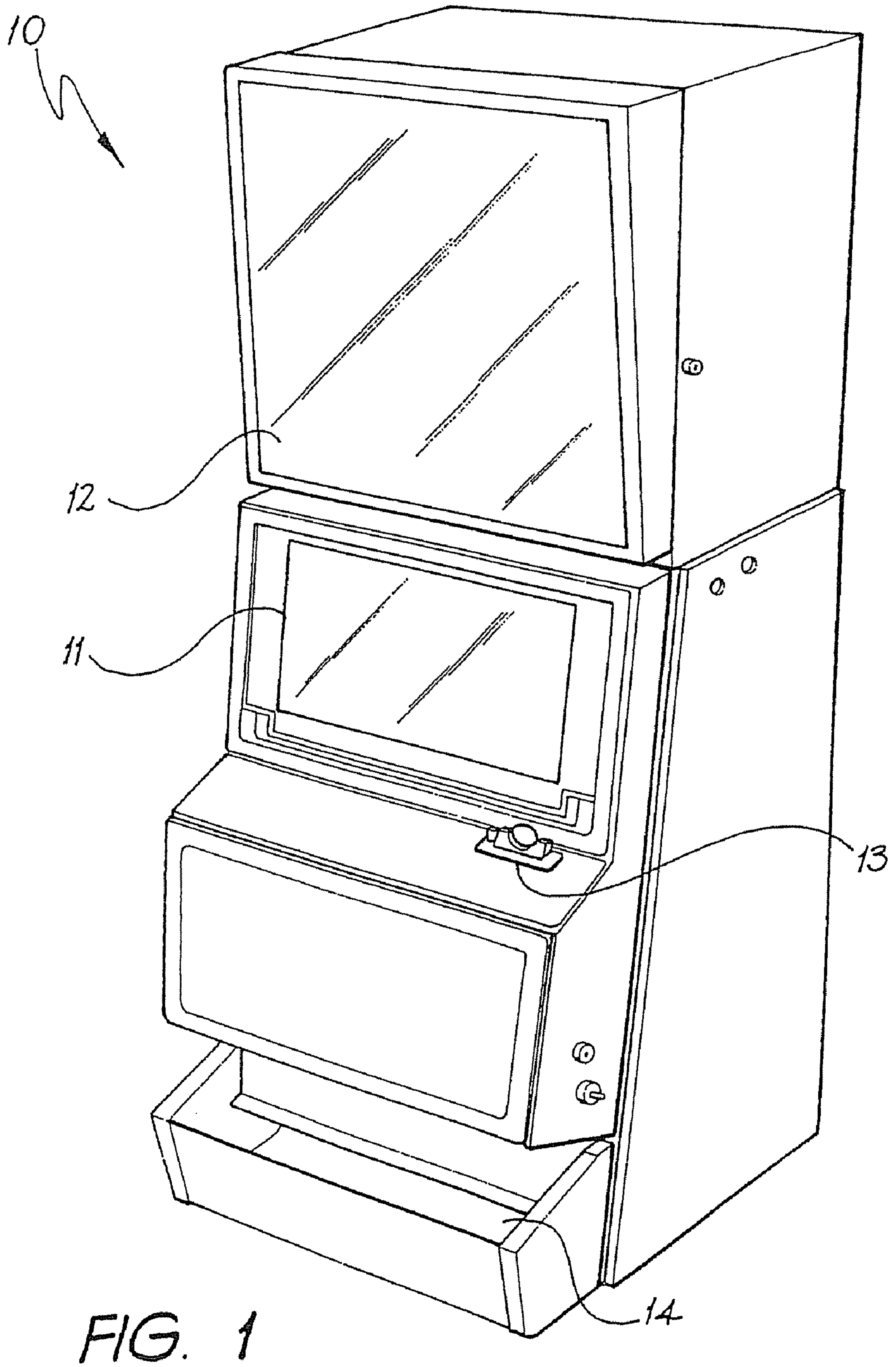
FIG. 1 illustrates a touch screen gaming console incorporating the present invention.
Figure 2:
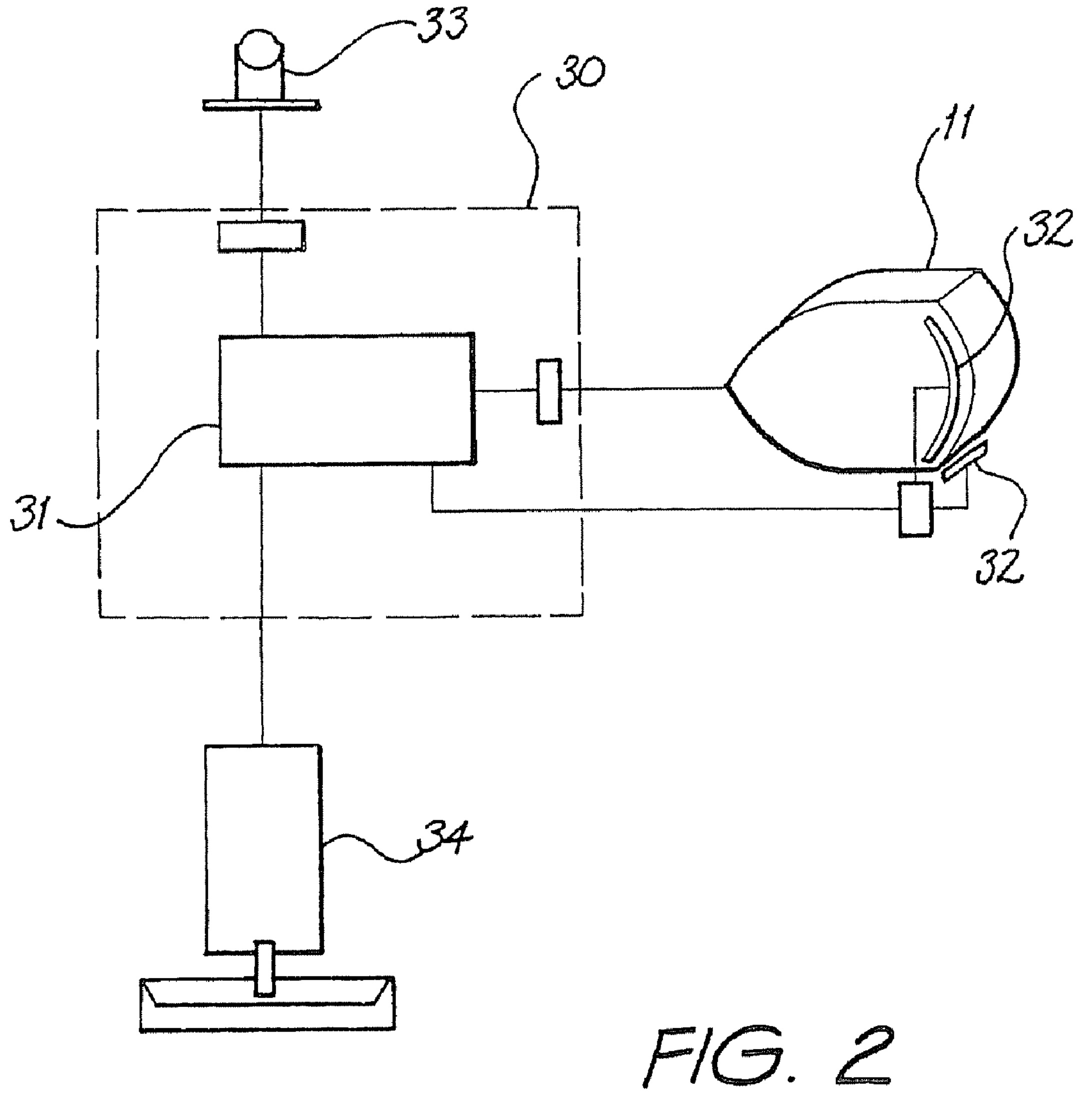
FIG. 2 is a schematic diagram of a gaming console control circuit.

Referring to FIG. 1, the illustrated embodiment of the invention is housed in a conventional gaming console cabinet 10 including a prize display 12, a coin entry slot 13, a payout tray 14 and internally mounted game control processor circuits (refer to FIG. 2).

The program to implement the game of the present invention runs on a standard gaming console control processor 31 as illustrated schematically in FIG. 2. This processor forms part of a controller 30 which drives the display screen 11 and receives input signals from input controls such as buttons or touch sensitive areas on a video display. In the illustrated embodiment, the controller receives touch input signals from touch sensors 32 as well as receiving coin input pulses from a coin chute mechanism 33 and sends signals to drive a coin payout mechanism 34.

This is a new type of video game which involves balls (objects) being dropped through a series of pins (obstacles) and eventually filling a number of containers.

It is similar in some respects to games known as Pachinko, which are pin and ball games popular in Japan, however, this video embodiment includes features not evident in prior art slot machines. Examples of the display layout of games according to the present invention are illustrated in FIGS. 3 & 4.

Figure 3:
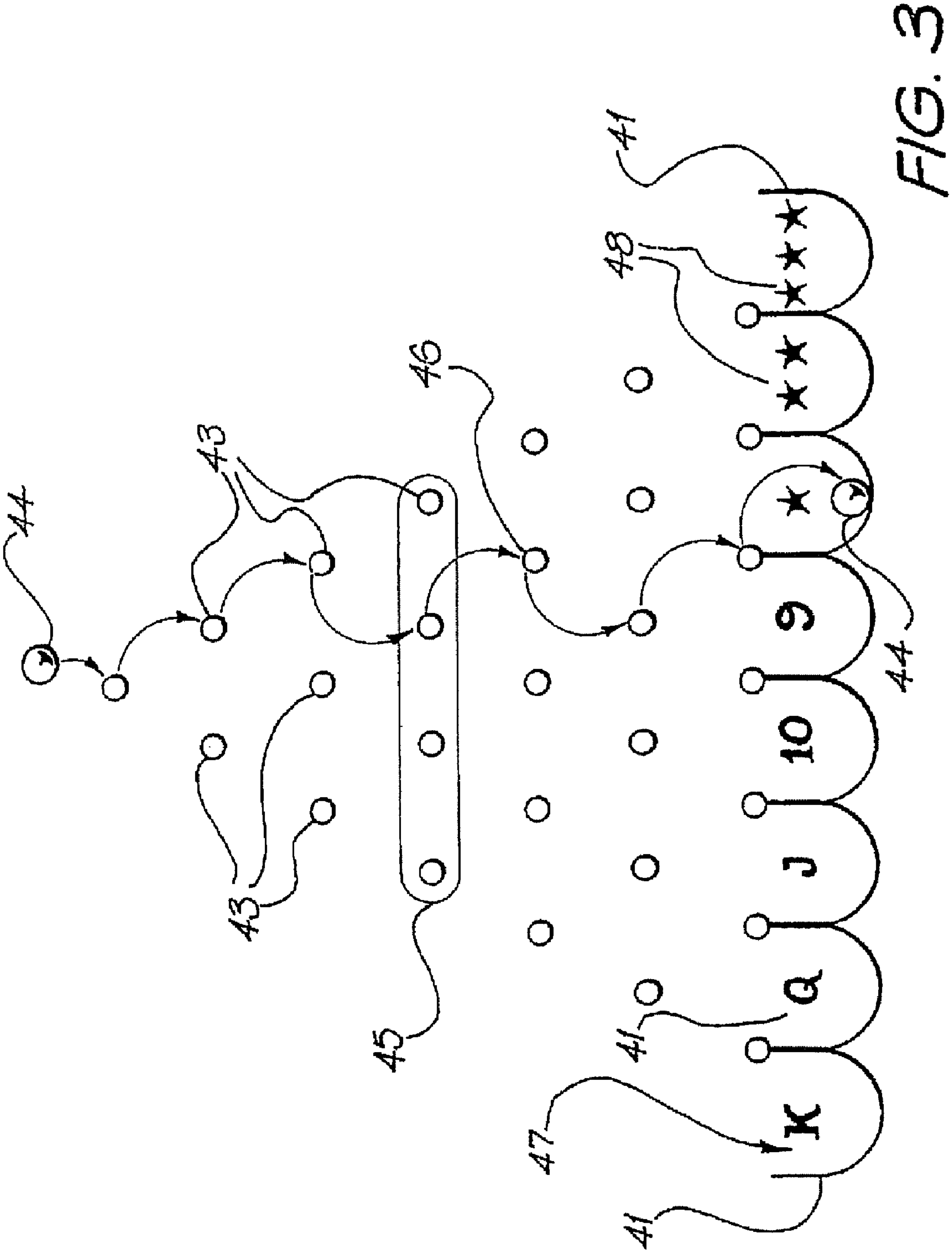
FIG. 3 is a diagram of a game screen with game features indicated.
Figure 4:
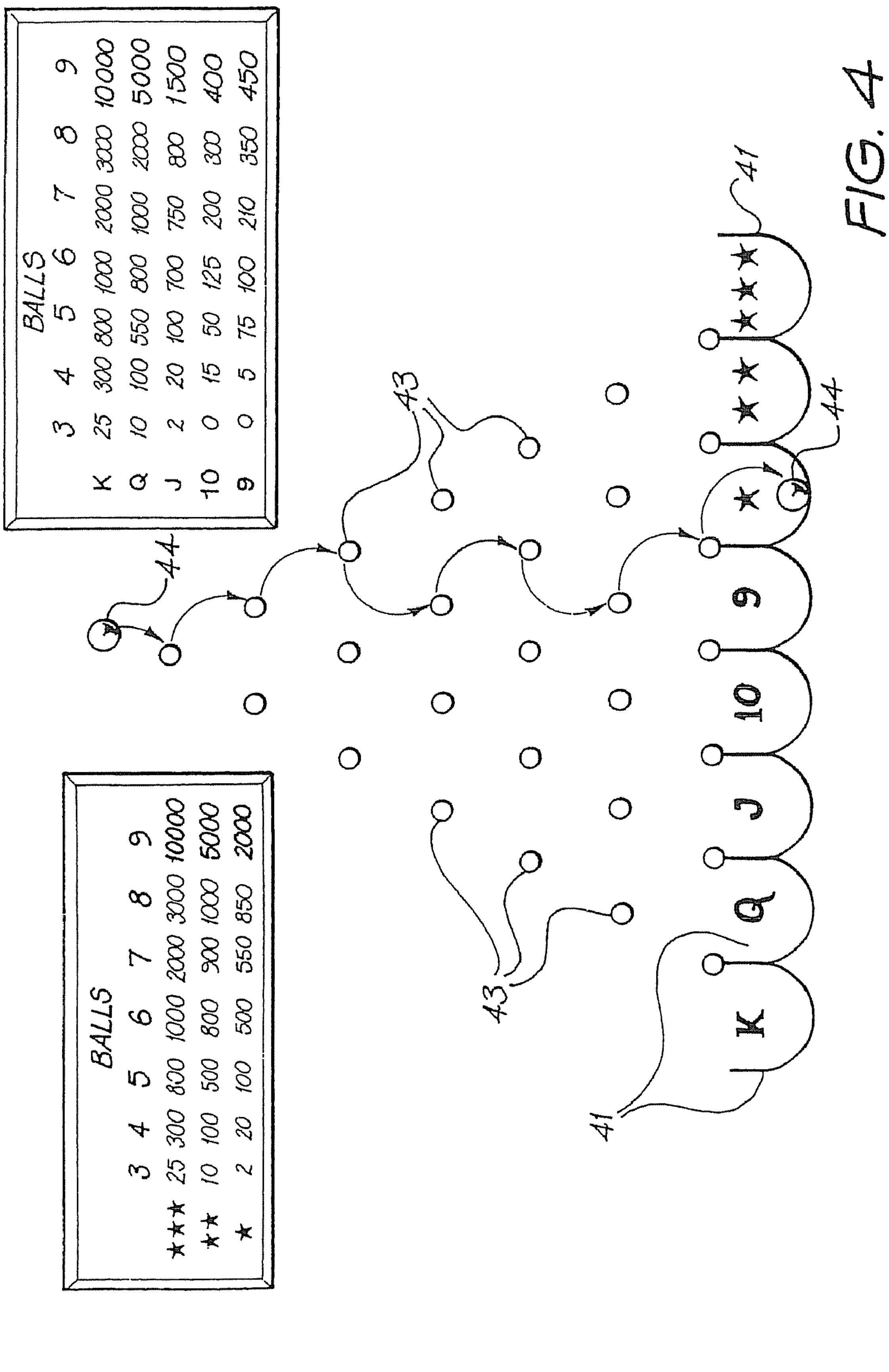
FIG. 4 is a diagram of a game screen showing prizes awarded for various numbers of balls in each of a plurality of buckets.

In FIG. 3, a game display is illustrated showing a plurality of possible game features in combination. The game includes as feature prizes:

a) free games
b) win multipliers
c) extra balls

As the balls 44 fall through the pins 42 and are collected in buckets 41, if each of the pins in the row 45 is hit (ie, by a different ball in this game, but in other games possibly by the same ball where rebounding and/or flippers are provided), a feature prize is awarded. A second feature is provided if all balls hit a particular pin 46. A third feature is provided if all balls fall into a single bucket 47. A fourth feature 48 is awarded if at least one ball falls into each bucket 41.

Referring to FIG. 4, a similar game to that of FIG. 3 is illustrated with pay tables shown for different number of balls in each bucket.

Figure 5:
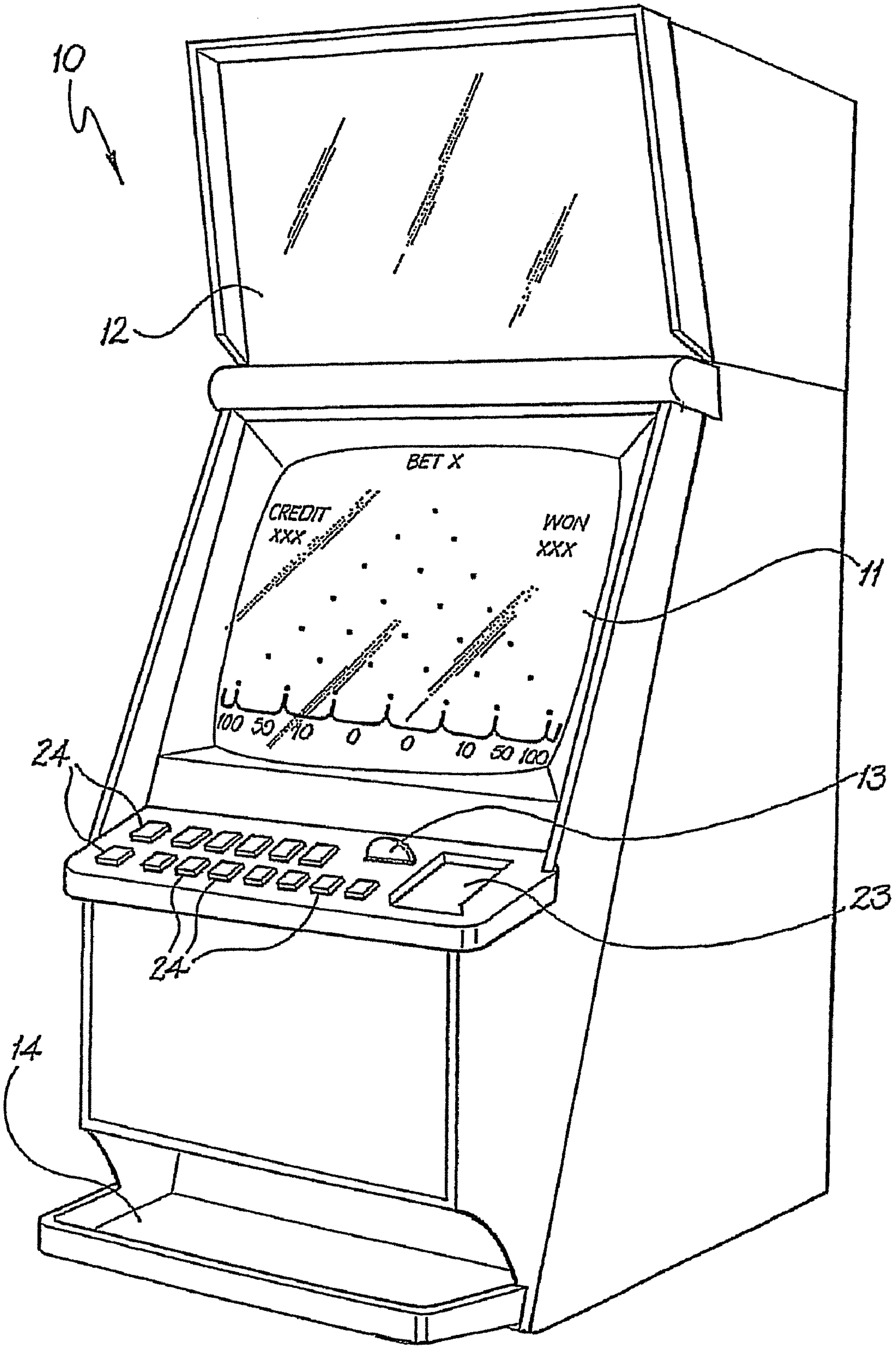
FIG. 5 illustrates a gaming console with button switch controls, incorporating a simple embodiment of the present invention.

Referring to FIG. 5, an example of a further simple embodiment of the invention is illustrated showing the entire console 10 with a simple game layout on the screen 11.

Again, the console includes a display panel 12, which has rules of the game and/or prize winning events illustrated for player information, a coin slot 13, video display screen 11 to display the game and a coin tray 14. As well, this embodiment has a bill acceptor 23 and push buttons 24 to control the game.

Figure 6:
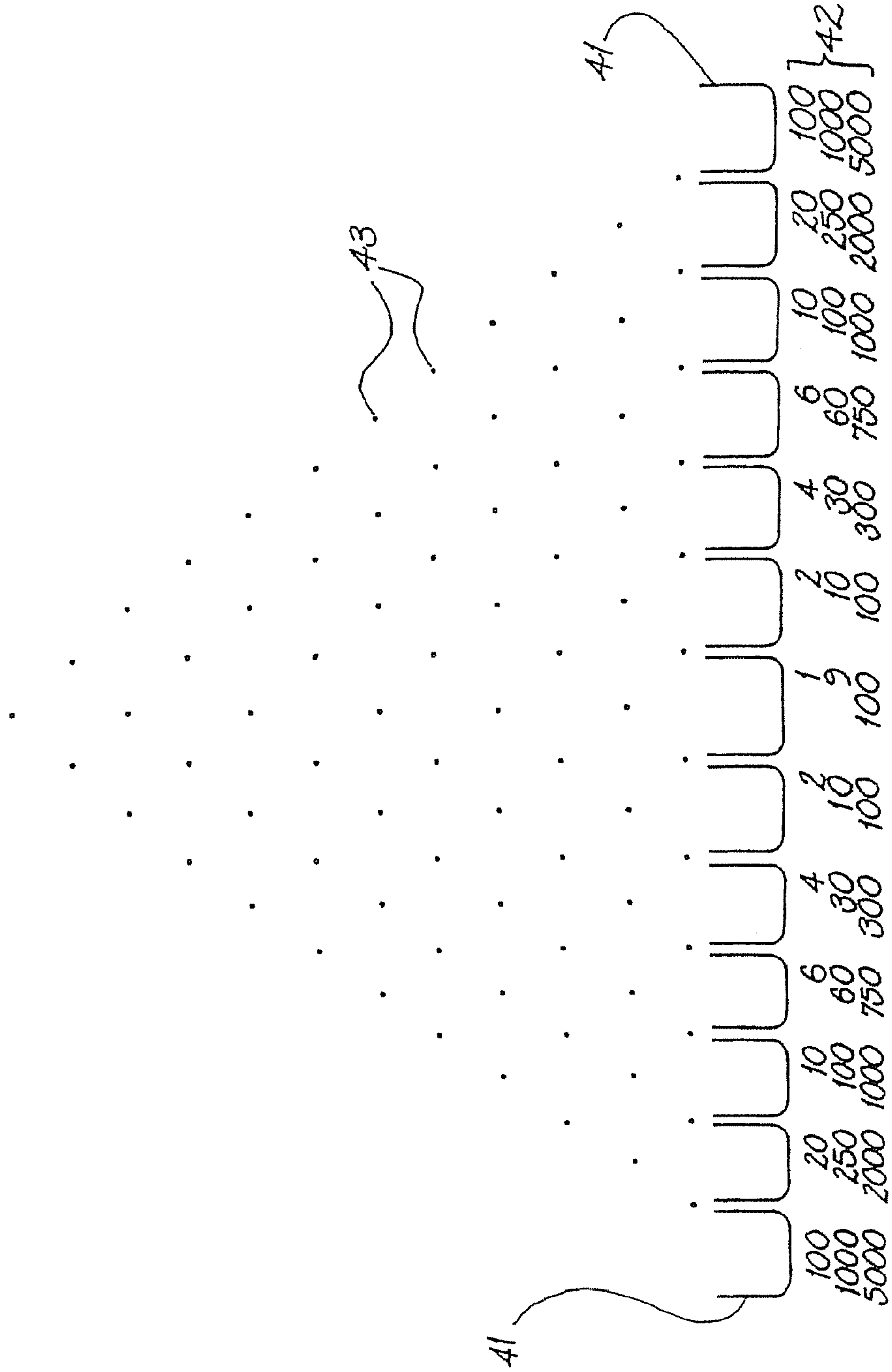
FIG. 6 illustrates a basic game screen layout without features.

FIG. 6 illustrates a basic game screen layout without additional game features. It should be noted that the different prize rows 32 under the buckets could be awarded for different numbers of balls, different types of balls (eg. shape, colour) or different ball combinations landing in the buckets; or even different ball drop patterns or similar.

Figure 7:
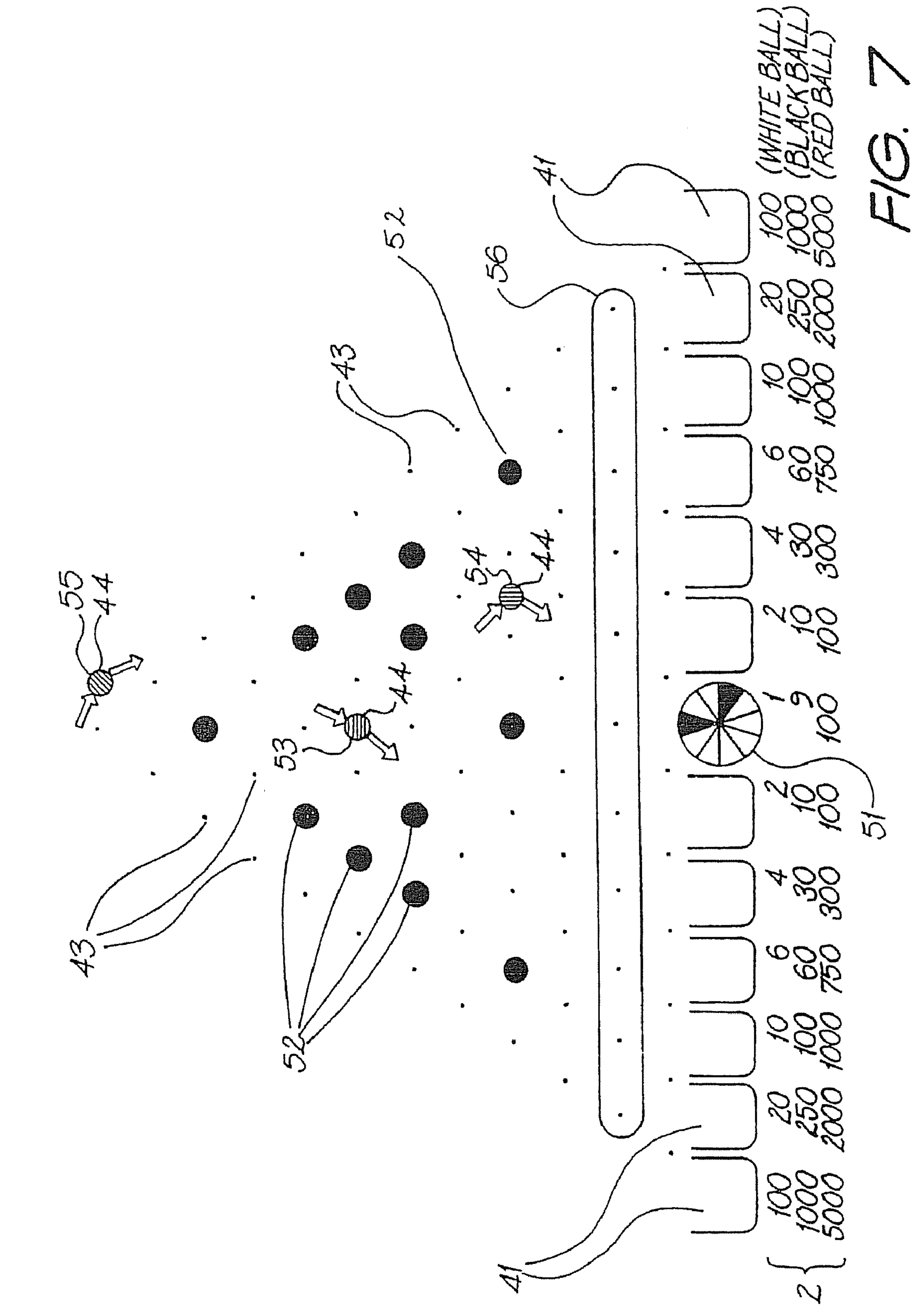
FIG. 7 illustrates a game screen layout with a set of preferred features.

FIG. 7 illustrates a game screen layout with a set of preferred features. In this embodiment the number of balls 44 dropped is dependent upon the number of credits staked (for example 1 credit buys 10 balls). A series of holes 52 are located amongst the pins such that if a ball passes over that point it will disappear from the screen. Balls that manage to avoid all of the holes 52 will either drop into a bucket 41 or through the chocolate wheel 51 at the bottom of the display. The balls 44 are in 3 different colours (randomly selected) 53, 45, 55 and prizes are paid at the end of the ball drop according to the colour of any balls that made it to a bucket 41. In the case of the chocolate wheel 51, prizes are awarded for each ball that drops through the chocolate wheel, causing the chocolate wheel to spin. The prize paid for the chocolate wheel is dependent upon the position in which the wheel stops. A feature is also included where one of the rows 56 below the holes contains pins that become lit when they are hit. If 3 or more pins become lit in one game then 10 free games are awarded during which all of the holes are replaced by pins (hence guaranteeing a prize for each ball).

Figure 8:
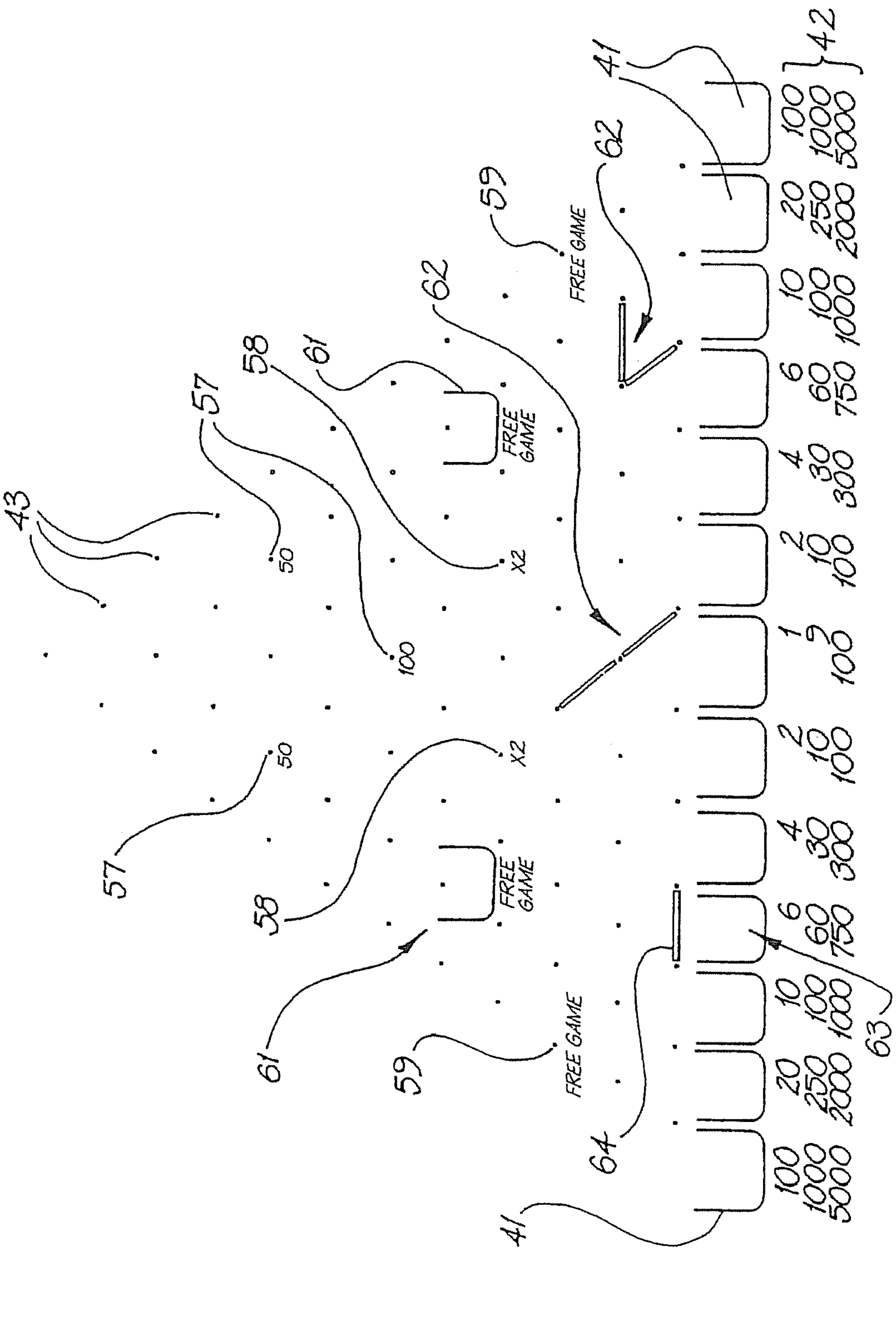
FIGS. 8-12 illustrate game screen layouts with further sets of preferred features.

FIG. 8 illustrates a game screen layout with a further set of preferred features. The features shown on this game layout are:

a) Fixed (or variable) prize awarded for any ball or a special ball (eg. colour, shape) or a pre-determined number of balls hitting a specific pin 57 (in the illustrated example, prizes are marked under the pins);
b) All wins from the game will be multiplied by a fixed (or variable) amount if any ball or a special ball (eg. colour, shape) or a pre-determined number of balls hit a specific pin 58;
c) One or more free games are awarded if any ball or a special ball (eg. colour, shape) or a pre-determined number of balls hit a specific pin 59;
d) Bonus or prize buckets 61 being placed in different positions;
e) Rods 62 joining pins to prevent balls from taking certain paths;
f) Buckets 63 may not always be open—a rod 64 may prevent the bucket 63 from being entered at certain times depending on triggers that occur in the game to open and close the bucket.

Figure 9:
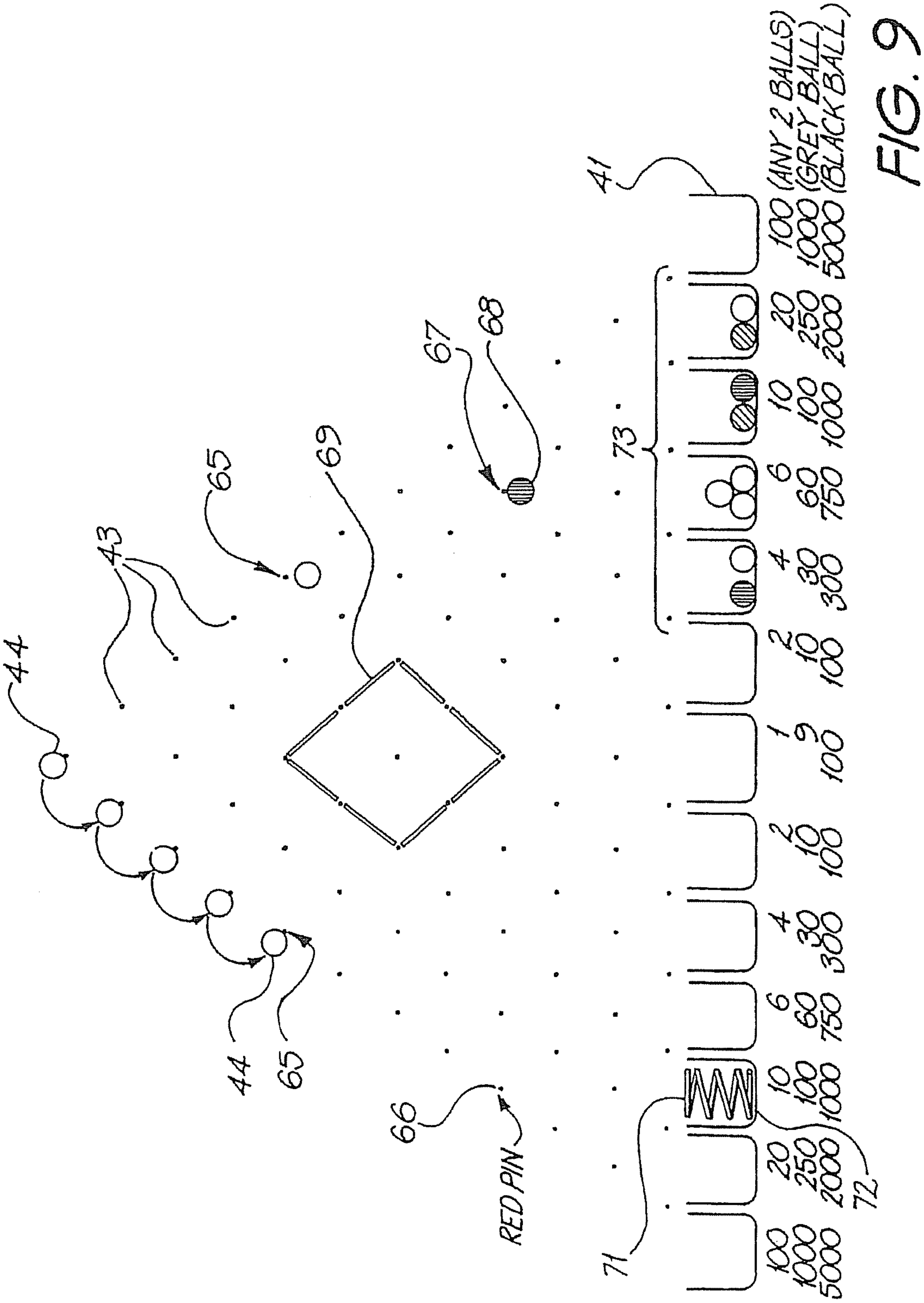
Figure 10:
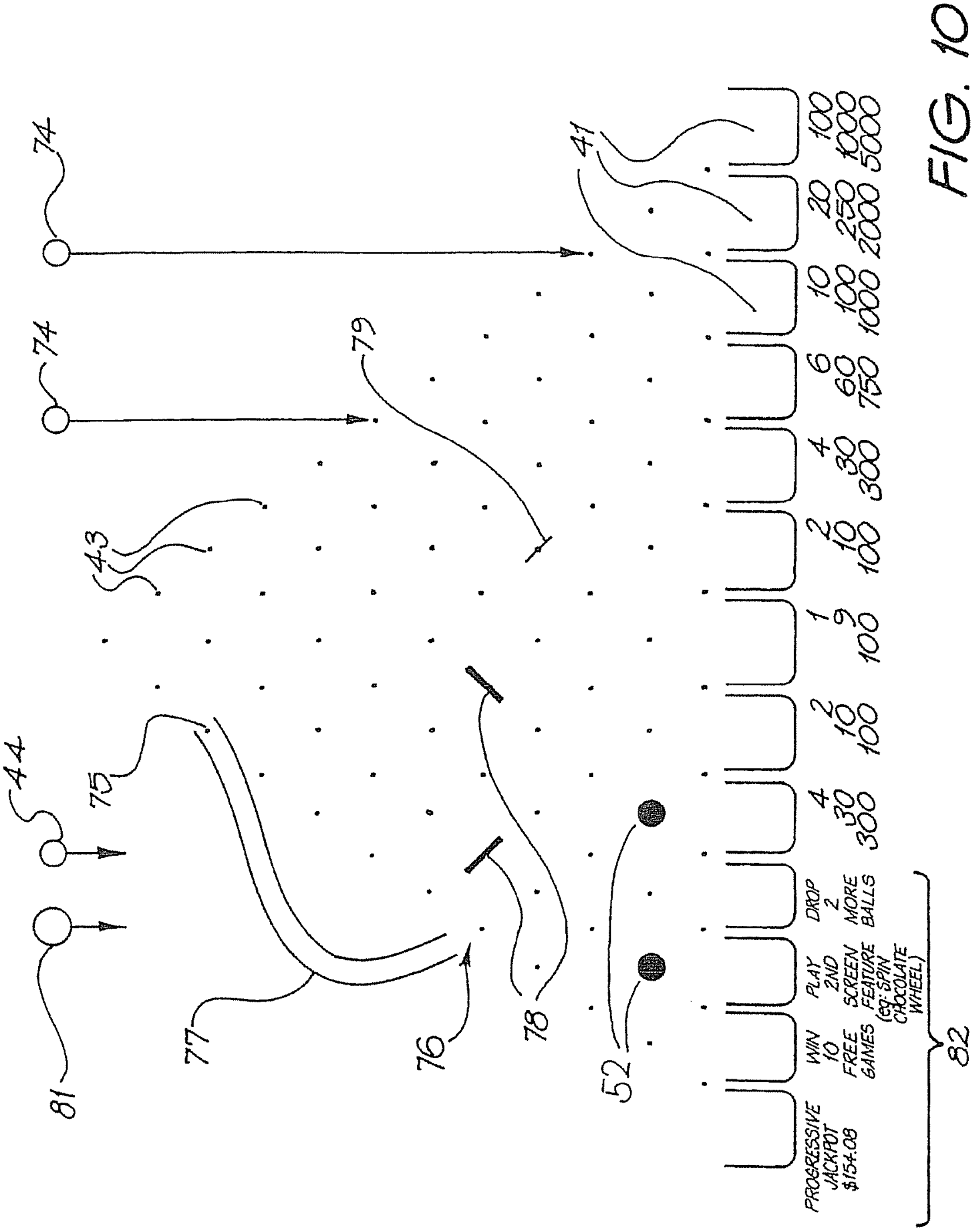

FIG. 9 illustrates a game screen layout with yet a further set of preferred features. The features shown on this game layout are:

a) Incrementing pins 65 where each time a ball or a specific type of ball hits the pin the indicator will increment. For example, a feature may be awarded when the incrementing pin reaches 5;
b) Different coloured pins 66 may give bonuses for being hit, or being hit by specific balls or a specified number of balls. The pins which are coloured may change from game to game;
c) Balls 68 may get stuck to certain pins 69 and/or when certain pins are hit a ball or balls may be released from the pin to drop in addition to the ball which hit the pin;
d) Certain features may involve complete sections 69 of the pin layout being blocked off giving an improved chance of balls landing in the outside buckets.

e) On certain occasions, a spring 71 may appear in a certain bucket(s) 72 such that if a ball lands in the bucket it will bounce back out again;

f) Different patterns of ball combinations 73 and colours in the buckets 41 may pay different amounts. In the diagram (assuming only the highest win will be paid), the first bucket will pay 300 for the black ball, the second will pay 6 for any 2 balls, the third will pay 1000 for the black ball and the fourth will pay 250 for the grey ball;

FIG. 10 illustrates a game screen layout with another set of preferred features. The features shown on this game layout are:

a) Dropping balls 74 from different positions will alter the chance of getting balls into the outside buckets. The drop position may be bought or random or a special feature;

b) A shortcut pin 75 may ensure that if it is hit the ball will be diverted to another position 76 on the screen via a path 77;

c) Flippers 78 may randomly or by way of player skill be used to flick balls in different directions when hit;

d) Diverter pins 79 can ensure that if they are hit the ball will fall in a fixed direction;

e) Different sized balls 81 could be used randomly or bought such that the bigger the ball the less likely it will fall into a hole;

f) A ball or a special ball (eg. colour, shape) or a pre-determined number of balls landing in certain buckets 82 may award special features instead of prizes.

Figure 11:
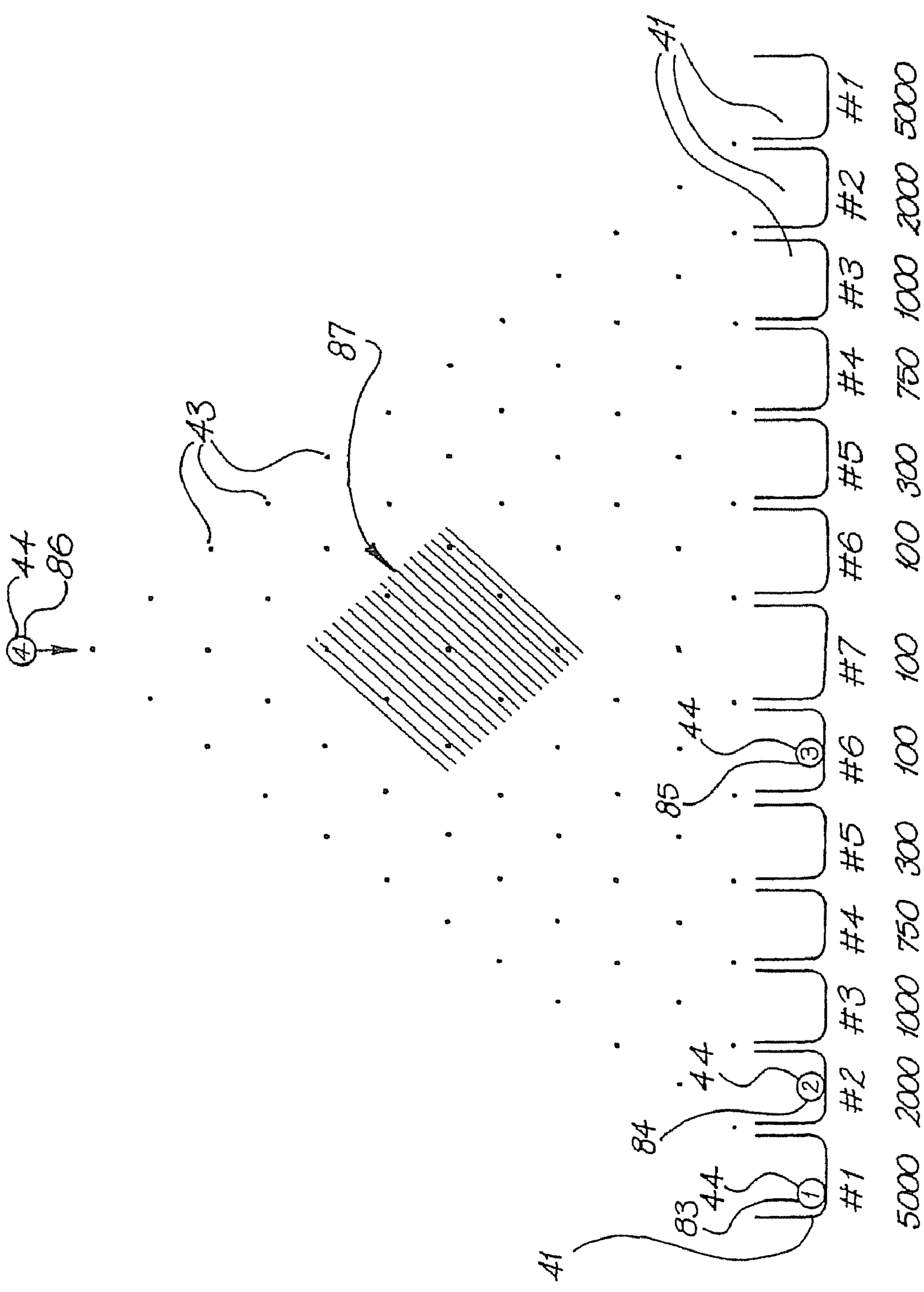

FIG. 11 illustrates a game screen layout with still another set of preferred features. The features shown on this game layout are:

a) Balls 83, 84, 85, 86 can be numbered for different features or win patterns. In this case, wins are paid if the correct numbered ball lands in the correct bucket.

b) Hence ball 83 (1) and fixed ball 84 (2) will pay 5000 and 2000 respectively, but 3 will not pay a prize;

c) Prize zones 87 may be used. For example, a bonus may be given if all the pins within a fixed zone are hit (and hence become lit).

Figure 12:
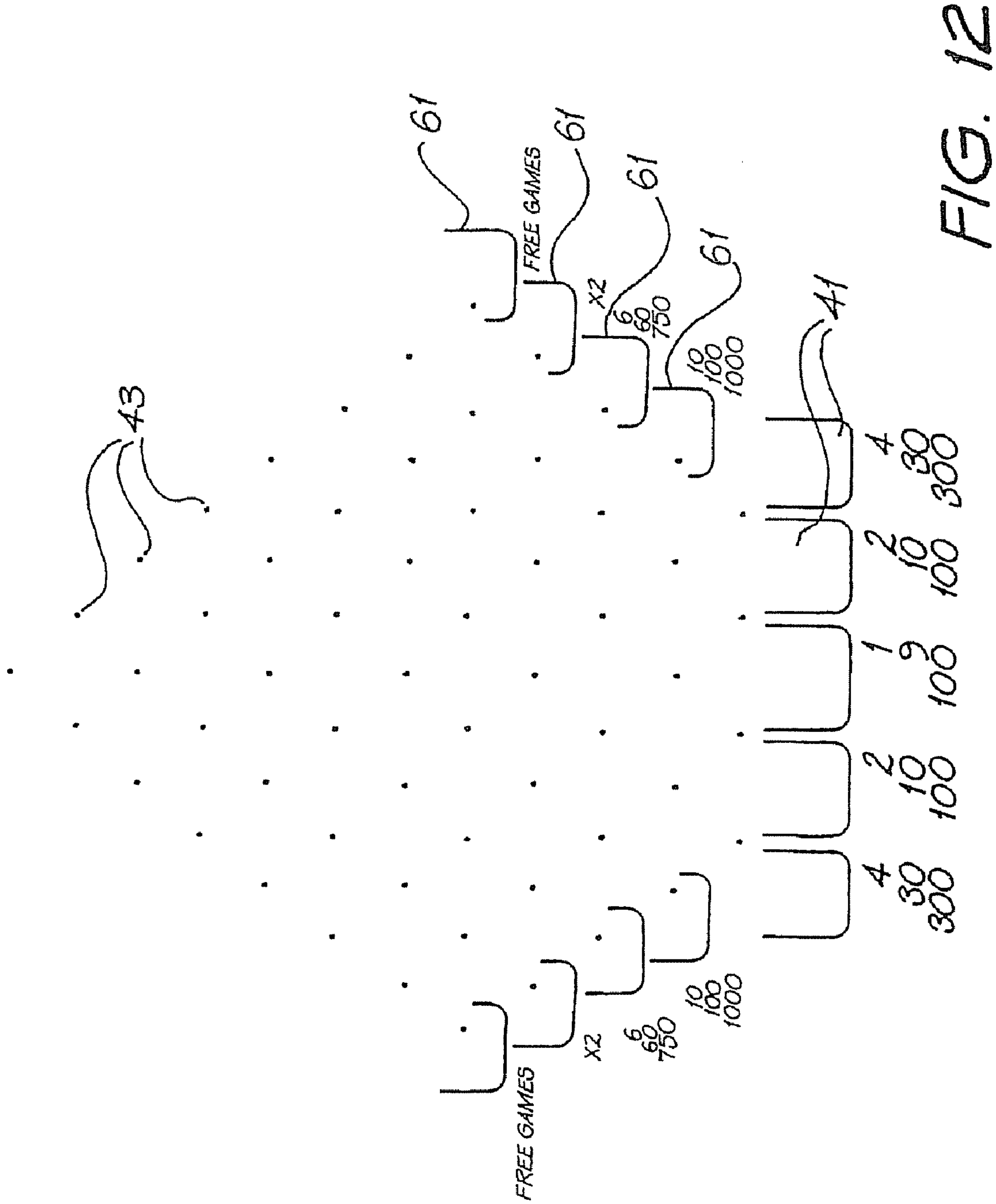

FIG. 12 illustrates a game screen layout with yet another set of preferred features. This diagram demonstrates how different shaped pin patterns can be used to vary the game.

Figure 13:
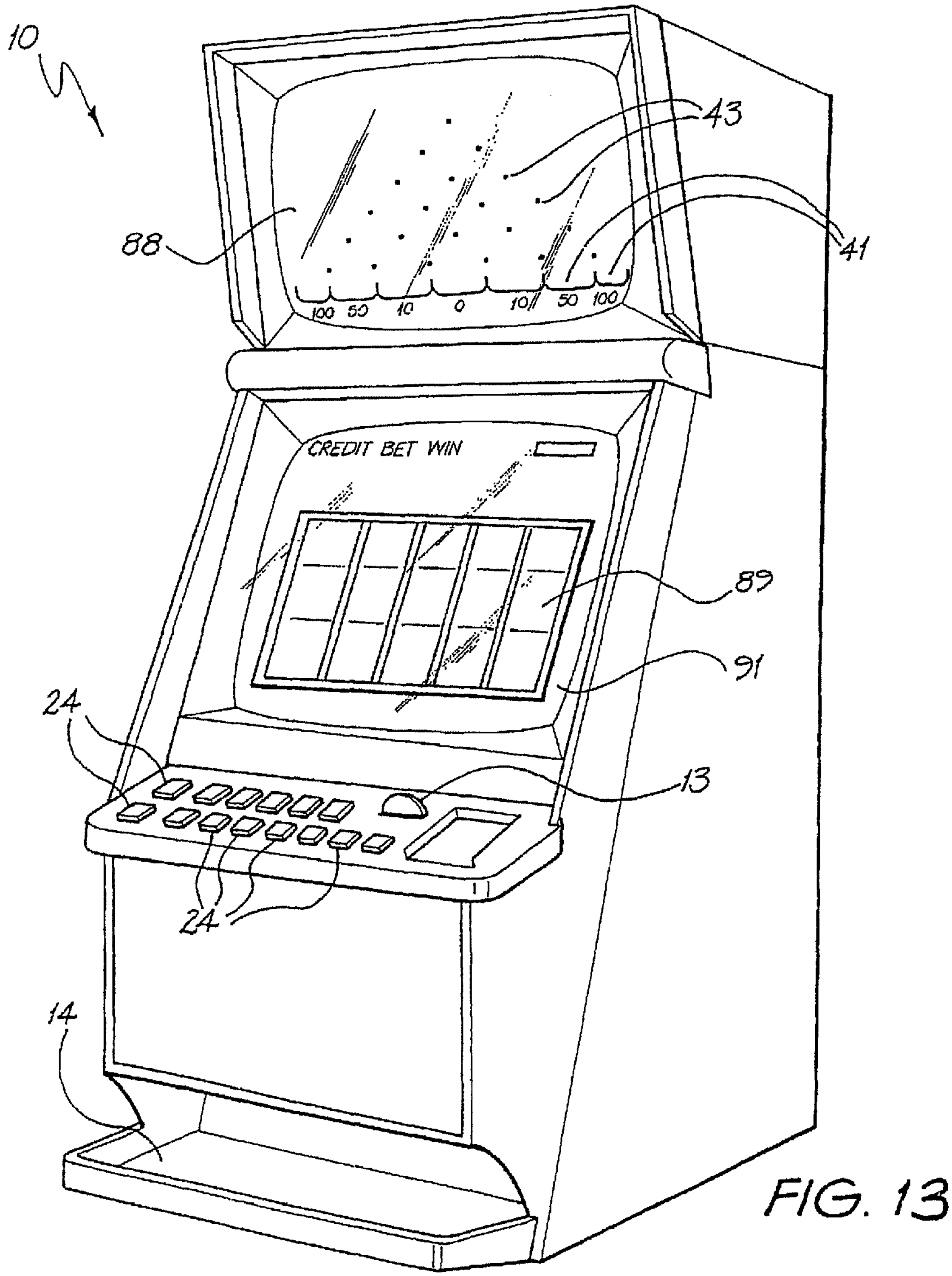
FIG. 13 illustrates a gaming console with button switch controls and two displays, incorporating a simple embodiment of the present invention in combination with another style of game (in this case a spinning reel game).

FIG. 13 illustrates a gaming console with button switch controls 24 and two displays, incorporating a simple embodiment of the present invention shown on a top screen 88 in combination with another style of game 89 (in this case a spinning reel game) shown on the lower screen 91.

Prizes are paid according to either the number of balls which are in each ball capturing location or container 41 at the end of the ball drop and/or the manner in which the pins are hit. Note that in the attached figures, the ball capturing locations are shown as cups, but may also be pairs of closely spaced pins (less than a ball diameter), or other suitable retaining device. Prizes may also be paid according to the type of balls dropped. For example, red balls may pay double the prize of the blue balls, or prizes may be paid according to indicia such as numbers on the balls which are in any container. When the indicia are numbers, the numbers may represent prize values or prize multipliers.

The plurality of game features described with reference to FIGS. 3-13 and those described below, can be mixed in a variety of other combinations and each of the features may be offered for purchase by the player in a particular game (eg, an additional card 7, may buy less holes or more cups).

The basic structure of the game can be varied by:

(i) changing the type of balls to be dropped, such as balls of different sizes, balls of different colours and/or balls carrying different numbers which are equal to prizes, (ii) changing the functions of balls to be dropped, (iii) changing the number of balls to be dropped, (iv) changing the position from where the balls are dropped, (v) changing the number of rows of pins, (vi) changing the pin pattern, (vii) awarding prizes/bonuses/features depending on how the containers and/or pins are hit, (viii) varying the number of balls such that the higher the bet, the more balls maybe purchased, (ix) changing the position of prize buckets, (x) changing the number or position of holes amongst the pins (xi) allowing access to different tools or controls which may affect the path of the balls, (xii) incorporating other types of games into the base game. For example, spinning reels (see below), keno, bingo, card games, second screen animations, chocolate wheels (see below) and so on. These could be bonus features awarded from the base game, base games that trigger a feature of the pin and ball game or may be played in conjunction with the base game (eg, reels spin and then balls drop for every game played).

Note that any of the types of game structures or features listed above, may change on a game by game basis or as a special feature when triggered by a particular event during the base game. In some cases, the player may even be able to select the structure that they want.

The betting strategy provided by the game can be any of the following:

(i) each credit buys one ball, therefore, a bet of 10 credits buys 10 balls, (ii) varying the number of balls such that the higher the bet the more balls drop, for example: Bet 1, 3, 6, 12 and 20 credits give 5, 6, 7, 8, and 9 balls respectively, (iii) varying the number of pins such that the higher the bet more or less rows of pins appear, (iv) varying the number of pins such that the higher the bet more or less pins appear, (v) varying the number of containers such that the higher the bet more containers become available. For example, a bet of 1 credit buys the first 4 containers from left to right; a bet of 2 credits buys all eight, (vi) varying the number of pin features such that the higher the bet more pin features can be won, (vii) varying the size of the prizes such that all prizes are multiplied (preferably linearly) by a factor which is a function of bet size, (viii) varying the number of active balls dropped, with the same number of balls being be dropped from game to game, independent of the number of balls purchased, and with unpurchased balls being distinguished by appearance, (ix) varying the size or shape of the balls to change the chance of specific effects occurring, (x) varying the location from which the balls are dropped, such that the further out from the centre that the balls drop, the greater chance of the balls landing in the outside buckets which will have larger prizes, (xi) varying the number of holes that appear for the balls to disappear into, (xii) varying the function of the balls under certain circumstances, (xiii) varying the number of tools available to re-direct the path of the balls, (xiv) varying the number of prize zones that are available, (xv) varying the number of balls required in a bucket to give a prize (i.e. a higher bet requires fewer balls), (xvi) varying the number of times a pin has to be hit or the number of pins that need to be hit in order to award a bonus feature (i.e. a higher bet requires fewer hits or fewer pins).

For the betting strategy where higher bets buy additional balls, a low bet may result in the balls that have not been bought still being shown to drop. In this way, the player can see prizes that they have missed due to their low stake, and can possibly still use the balls that weren't bought towards feature triggers. The balls that have not been bought would need to be easily distinguished from the bought balls, for example, they could be smaller and/or transparent in appearance, or merely a different colour.

In general, prizes will be paid according to how many balls are in each container.

Containers may have the following features or characteristics:

(i) a free game, free balls or any other type of bonus can be won when certain containers are filled in a pre-determined way, for example: 10 free games are won when 2 or more balls end up in the last column, (ii) containers may not always be open, they may have a top or cover which can prevent balls from entering the container under certain conditions, (iii) some containers may have springs which will flick the balls to other containers, (iv) some containers may become bonus baskets, (v) a specified number of balls may need to drop into the same container in order to win a prize or jackpot, for example, 3 balls in container 1, pays 100 credits, (vi) balls may remain in the containers across multiple games allowing them to accumulate as each game is played, (vii) as a special feature, the prizes associated with particular containers may become much larger, (viii) an animated object may sit above the container and catch balls before they drop into a container possibly moving them to other locations, (ix) roaming containers could exist that move position from game to game or as the balls drop or as a special feature, the containers may also be moving while the balls drop.

Pins can also be provided with specific features or characteristics as follows:

(i) depending on either the number of times each pin is hit and/or whether or not certain patterns such as a row, diagonal or diamond shape made up of hit pins occurs, prizes or bonuses are paid such as:

free games free balls second screen features wins multiplied by odds progressives, (ii) the pins can occur in different patterns from game to game, for example: in one game they make up a triangular shape; in another, a diamond shape, (iii) pins may swallow or capture balls when hit, (iv) pins may release balls when hit, (v) each time a pin is hit it may become lit, change colour and/or record the number of hits to award bonuses, (vi) pins may have different colours so that when a certain combination of colours are all lit bonuses are paid, (vii) pins may be tilted so that the ball bounce will be biased to one side, (viii) pins may have holes in them for the ball to pass or may be able to be knocked over for the ball to continue on its path, (ix) pins, in any pattern, may randomly flash during the ball drop sequence awarding bonuses, (x) pins may be greyed out or move in and out to make it easier/harder for balls to roll, (xi) pins may be joined by a rod to block balls from rolling down certain paths, (xii) pins may have numbers on them which represent the amount of credits, free games, etc. won when they are either hit or lit, (xiii) when all pins are hit/lit a bonus is paid, (xiv) some pins may have the ability to flick the ball in any direction, (xv) some pins may be sticky such that if a ball hits them, it will stick and stay on the pin, this could create a block where balls can no longer pass through that position or another ball could be required to hit the stuck ball in order to dislodge it, (xvi) for the duration of a free game feature, all holes that are normally present to swallow balls during the base game could be replaced by pins hence guaranteeing a prize for each ball dropped in a free game (or at least giving a higher probability of prizes), (xvii) there may be feature pins, for example, free game pins such that if a certain number of free game pins are hit a free game feature will be awarded, alternatively, "shortcut" pins such that when a ball hits the shortcut pin it will skip straight to another position on the screen, (xviii) pins may have deflectors such that when hit, the will always deflect a ball in one specified direction, (xix) as a special feature, the centre pin or pins may become larger, blocking off access through the centre and hence increasing the chance of balls falling towards the outer containers, (xx) all pins may become the same colour as a special feature, (xxi) "elastic bands" may be placed around 2 or more pins such that if a ball drops against the band, it will be bounced off rather than merely deflected.

Balls can also have different features and characteristics as follows:

(i) the balls may be the same colour, different colours during the same game or change colours from game to game, they may also have numbers on them, both the colouring and numbers can be utilised to award prizes, (ii) special balls when hitting pins may split up into a number of balls, (iii) special balls may have the ability to jump from column to column and award prizes, (iv) special balls will enable bonuses to be found, (v) there may be a larger ball which can knock pins over or split into smaller balls, (vi) balls may fall down the pin holes, (vii) a slot reel, chocolate wheel or other mechanism may be activated by a ball or other means to provide a multiplier, bonus or trigger, (viii) different sized balls could be provided such that bigger balls are less likely to fall down holes, (ix) different shaped balls could be provided such that spherical balls can only fall down round holes, cubic "balls" will only fall down square holes, elliptical "balls" can only fall down oval holes etc, (x) large balls or "superballs" may block holes or knock out pins, (xi) the speed of the ball drop may differ depending upon the size of the ball, (xii) as balls drop, the path that they follow may be plotted, for example, the pins that they hit may change colour, if another ball follows that same path or a lit path a bonus (prize or feature) may be given, alternatively, if all pins become lit, a bonus (prize or feature) may be give, the lit pins may even be carried across from one game to the next, (xiii) as balls drop, blockages formed as a blocking element such as a pin or other object may be placed along the path that they follow such that no other ball may drop through the blockages, (xiv) the balls could be in the shape of coins or other objects, (xv) certain balls may alter the paths for other balls, for example, if a certain ball drops in one direction when it hits a particular pin, then all balls to hit the same pin from then on will also drop in that same direction, (xvi) when balls drop into holes something may happen to them, for example, they may be channelled into containers or come out other holes or re-appear in other sections of the screen, (xvii) balls may change colour as they drop, or may change the colour of pins that they hit to their own colour, similarly, certain balls that drop into a container may change the colour of all other balls in that same container, (xviii) some wins could be paid in balls rather than credits, that is, certain events may cause extra balls to be dropped as part of the same game, these may or may not be at extra cost to the player, (xix) some balls may "defy gravity" by 'dropping' across the screen horizontally or upwards or similar, hence, prize containers may appear on all sides of the pin layout rather than just at the bottom, (xx) "Fireballs" may exist that burn the pins as they hit them, (xxi) balls may be numbered or have letters on them, if they land in a certain order or spelling a specific word, a bonus (prize or feature) may be awarded, (xxii) holes may disappear or close up as soon as a ball drops into them.

Skill elements can also be provided in a game, for example:

(i) games may include an element of skill provided by including player controls which enable the player to drop or project the balls at different angles, (ii) the game may have a flipper to flick the balls.

Tools or Controls can also be provided in some games such as:

(i) flippers could be provided at certain locations such that if a ball hits the flipper it will (automatically or by control of the player) be flicked back to drop through some or all of the pins again, hence providing a second chance at prizes or feature triggers, (ii) ladders, magnets or some other objects could cause the balls to move upwards or in other directions instead of just dropping downwards.

In certain games, a game feature of a chocolate wheel can be provided which could have features such as:

(i) a chocolate wheel could replace a prize container where as the ball drops through the chocolate wheel, it will spin and pay the prize that is spun up, (ii) an independent chocolate wheel could be displayed where certain triggers or prizes can cause the chocolate wheel to spin to reveal a bonus by way of a prize, win multiplier, number of free games, extra balls to drop, change in the game structure or similar, (iii) an independent chocolate whee could be displayed so that whenever balls fall into certain containers or similar, the chocolate wheel will spin to reveal the prize that will be awarded.

Games can also include a game feature of spinning reels which may have features such as:

(i) a spinning reel game could be played above the pins such that when a winning combination occurs on the reels, coins could come out from below the reels and drop into the pins so that the base game determines the prize, (ii) a spinning reel game element could be used to determine the base game structure, for example, the prize values, position of holes, number of pins, pin layout or similar, (iii) containers could have multipliers on them, then, when a win on a spinning reel game occurs, a ball could be dropped through the pins to determine how much the win will be multiplied by.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An electronic gaming console having credit means, reward means, game control means, display means, and player input controls, the control means being responsive to the credit means and the player input controls to play a game which is displayed on the display means and if a winning event occurs, a player reward is awarded by the reward means, the gaming console being characterised in that the game provides a video display of a labyrinth of pins on the display means and the player input controls allow a player to initiate motion of virtual ball images on the display means, player rewards being awarded when virtual ball images come to rest in predetermined prize winning locations of the display means, wherein the predetermined prize winning locations in which the virtual ball images come to rest include a row of buckets disposed below the labyrinth of pins, wherein the labyrinth of pins has a pin configuration that is dependent on credits wagered in the credit means, wherein the player input controls allow the player to initiate firing of the virtual ball images on the display means and to control firing parameters for the virtual ball images.

2. The electronic gaming console as claimed in claim 1, wherein the player controls include a control to control firing speed of the virtual ball images.

3. The electronic gaming console as claimed in claim 1, wherein the player controls include a control to control firing direction of the virtual ball images.

4. The electronic gaming console as claimed in claim 1, wherein the player controls include a control to affect or control the trajectory of a virtual ball image after it is fired.

5. The electronic gaming console as claimed in claim 1, wherein a number of virtual ball images provided to the player for a game is dependent upon a number of credits bet on the game.

6. The electronic gaming console as claimed in claim 1, wherein virtual ball images of different colours are provided and a value of prizes awarded are determined according to colours of virtual ball images dropped through the labyrinth of pins.

7. The electronic gaming console as claimed in claim 1, wherein at least one virtual ball image changes colour as it drops through the labyrinth of pins.

8. The electronic gaming console as claimed in claim 1, wherein at least one virtual ball image changes a colour of any pins that it hits as it drops through the labyrinth of pins to its own colour.

9. The electronic gaming console as claimed in claim 1, wherein at least one virtual ball image, if it drops into a bucket, changes a colour of all other balls in that same container at the end of the game.

10. The electronic gaming console as claimed in claim 1, wherein the number of virtual ball images dropped is variable from game to game.

11. The electronic gaming console as claimed in claim 1, wherein the game permits a varying of a number of active ball images to be purchased and dropped, while maintaining a constant total number of virtual ball images being dropped from game to game, the total number of virtual ball images being independent of the number of active virtual ball images dropped.

12. The electronic gaming console as claimed in claim 1, wherein the buckets of the row of buckets are arranged to block virtual ball images from moving out of play below the row.

13. The electronic gaming console as claimed in claim 5, wherein each credit bet in any one game by the player buys one virtual ball image.

14. The electronic gaming console as claimed in claim 5, wherein a number of virtual ball images provided for a first credit is different to the number of virtual ball images provided for subsequent credits wagered on a single game.

15. The electronic gaming console as claimed in claim 5, wherein each credit bet by the player buys more virtual ball images than a previous credit bet in any one game.

16. The electronic gaming console as claimed in claim 10, wherein the number of virtual ball images dropped is selectable by the player.

17. The electronic gaming console as claimed in claim 11, wherein the total number of virtual ball images includes unpurchased virtual ball images, wherein the unpurchased virtual ball images are distinguished from the purchased virtual ball images by appearance.

18. The electronic gaming console as claimed in claim 11, wherein the unpurchased virtual ball images are available to trigger awarding of a feature game or bonus.

19. The electronic gaming console as claimed in claim 17, wherein the unpurchased virtual ball images are distinguished from the purchased virtual ball images by being transparent.

20. The electronic gaming console as claimed in claim 17, wherein the unpurchased virtual ball images are distinguished from the purchased virtual ball images by colour.

21. The electronic gaming console as claimed in claim 17, wherein the unpurchased virtual ball images are distinguished from the purchased virtual ball images by size.

22. The electronic gaming console as claimed in claim 12, further comprising virtual holes displayed on the display means at one or more locations of the labyrinth of pins, wherein the virtual holes are configured to catch virtual ball images to remove them from game play when the location of the virtual hole coincides with a position of a virtual ball image on the display means.

23. An electronic gaming system comprising:

a credit acceptor configured to receive a wager from a player to play a game;

a payout mechanism configured to provide a reward to the player;

a player input control configured to allow the player to interact with the game;

an electronic display configured to provide the player with a visual display of the game; and a controller configured to interface with the credit acceptor, the payout mechanism, the player input control, and the electronic display, wherein the controller executes predetermined operations including:

controlling the electronic display to display a labyrinth of pins interfacing with the player input control on the electronic display, controlling motion of virtual ball images on the electronic display in response to manipulation of the player input control, and interfacing with the payout mechanism to provide player rewards when the virtual ball images come to rest in predetermined prize winning locations on the electronic display, wherein the predetermined prize winning locations at which the virtual ball images come to rest include a row of buckets disposed below the labyrinth of pins, wherein the labyrinth of pins has a pin configuration that is dependent on the wager of the player.

24. The electronic gaming system as claimed in claim 23, further comprising a wheel disposed in the row of buckets, wherein the controller directs the electronic display to spin the wheel in response to virtual contact between the wheel and a virtual ball image.

25. The electronic gaming system as claimed in claim 23, wherein the row of buckets are arranged to block virtual ball images from moving out of play below the buckets.

26. The electronic gaming system as claimed in claim 24, wherein the controller directs the electronic display to stop spinning the wheel some time after virtual contact between the wheel and the virtual ball image, and wherein the controller interfaces with the payout mechanism to provide a reward to the player if the wheel stops spinning at a predetermined winning position.

27. The electronic gaming system as claimed in claim 25, wherein the controller directs the electronic display to provide virtual holes disposed at one or more locations of the labyrinth of pins, wherein virtual coincidence between a position of a virtual ball image and a position of a virtual hole on the electronic display removes the virtual ball image from game play.

28. An electronic gaming system comprising:

a credit acceptor configured to receive a wager from a player to play a game;

a payout mechanism configured to provide a reward to the player;

a player input control configured to allow the player to interact with the game;

an electronic display configured to provide the player with a visual display of the game; and a controller configured to interface with the credit acceptor, the payout mechanism, the player input control, and the electronic display, wherein the controller executes predetermined operations including:

controlling the electronic display to display a labyrinth of pins, interfacing with the player input control on the electronic display, controlling motion of virtual ball images on the electronic display in response to manipulation of the player input control, and interfacing with the payout mechanism to provide player rewards when the virtual ball images come to rest in predetermined prize winning locations on the electronic display, wherein the predetermined prize winning locations at which the virtual ball images come to rest include buckets below the labyrinth of pins, and wherein an amount of the wager by the player determines how buckets below the labyrinth of pins are arranged.

29. The electronic gaming system of claim 28, wherein the buckets of the row of buckets are disposed immediately adjacent one another in a side-by-side relationship below the labyrinth of pins.

30. The electronic gaming system as claimed in claim 28, wherein the buckets of the row of buckets are arranged to block virtual ball images from moving out of play below the buckets.

* * * * *